United States Patent [19]

Grögler et al.

[11] 4,294,934
[45] Oct. 13, 1981

[54] PROCESS FOR THE PRODUCTION OF ELASTIC, OPTIONALLY CELLULAR, POLYURETHANE UREAS

[75] Inventors: Gerhard Grögler; Jürgen Schwindt; Otto Ganster; Hans-Joachim Meiners, all of Leverkusen; Hans-Dieter Ruprecht, Cologne, all of Fed. Rep. of Germany

[73] Assignee: Bayer Aktiengesellschaft, Leverkusen, Fed. Rep. of Germany

[21] Appl. No.: 164,752

[22] Filed: Jun. 30, 1980

[30] Foreign Application Priority Data

Jul. 12, 1979 [DE] Fed. Rep. of Germany ....... 2928182

[51] Int. Cl.$^3$ ............... C08G 18/76; C08G 18/22; C08G 18/18
[52] U.S. Cl. ................... 521/160; 260/37 N; 521/158; 521/159; 521/51; 521/129; 528/75; 528/906; 528/52; 528/53; 528/58
[58] Field of Search ................ 521/160; 528/67

[56] References Cited

U.S. PATENT DOCUMENTS

| | | | |
|---|---|---|---|
| 3,188,302 | 6/1965 | Lorenz | 260/77.5 |
| 3,736,350 | 5/1973 | Meckel et al. | 260/471 R |
| 4,036,820 | 7/1977 | Olstowski | 528/67 |
| 4,039,581 | 8/1977 | Frulla et al. | 521/160 |
| 4,071,558 | 1/1978 | Bentley | 521/160 |
| 4,118,411 | 10/1978 | Reiff et al. | |
| 4,125,545 | 11/1978 | Kroplinski et al. | 528/67 |
| 4,137,200 | 1/1979 | Wood et al. | 521/160 |
| 4,162,357 | 7/1979 | Kubens et al. | |
| 4,163,095 | 7/1979 | Kubens | |

Primary Examiner—H. S. Cockeram
Attorney, Agent, or Firm—Gene Harsh; Joseph C. Gil

[57] ABSTRACT

The instant invention is directed to a process for the production of polyurethane urea elastomers having a gross density of more than 200 kg/m$^3$ comprising: casting a reaction mixture of
 (A) an isocyanate prepolymer produced from
  (a) 1 mole of a compound containing at least 2 Zerewitinoff-active hydrogen atoms and having a molecular weight of from 400 to 10,000 and
  (b) 2 to 10 moles of diisocyanatodiphenylmethane,
 (B) an aromatic diamine, and
 (C) 0 to 50 mole percent, based on component (B), of a polyol containing primary hydroxyl groups and having a molecular weight of from 62 to 6000, the equivalent ratio between component (A) and components (B) + (C) amounting to between 0.9:1 and 1.3:1,
into a mold, hardening the reaction mixture in the mold and subsequently removing it from the mold, the improvement wherein said isocyanate prepolymer (A) has been produced using an isomer mixture comprising:
 from 15 to 80 mole percent of 2,4'-diisocyanatodiphenylmethane,
 from 20 to 85 mole percent of 4,4'-diisocyanatodiphenylmethane, and
 from 0 to 20 mole percent of 2,2'-diisocyanatodiphenylmethane.

4 Claims, No Drawings

PROCESS FOR THE PRODUCTION OF ELASTIC, OPTIONALLY CELLULAR, POLYURETHANE UREAS

BACKGROUND OF THE INVENTION

This invention relates to the production of polyurethane urea elastomers having improved mechanical properties by the casting process. The improvement is obtained by using certain isomer mixtures of diphenylmethane diisocyanate as isocyanate component in the synthesis of the elastomers.

It is known, for example, from Vieweg-Hochtlen, Kunststoff-Handbuch, Vol. VII, Carl-Hanser-Verlag, Munich, 1966, pages 206-297, that NCO-group-containing prepolymers based on relatively high molecular weight polyols (for example, polyethers or polyesters) and symmetrical diisocyanates (such as, for example, 4,4'-diphenylmethane diisocyanate or 1,5-naphthylene diisocyanate) can be processed by casting with short-chain diols (preferably 1,4-butane diol) as chain-extending agent to form high-quality elastomers. As is known, the elastomers can only be obtained in a satisfactory quality by using chemically pure diisocyanates as the isocyanate component. Thus, as little as 10% of 2,4'-diphenylmethane diisocyanate, for example, in 4,4'-diphenylmethane diisocyanate, is sufficient to produce a distinct reduction in the quality of the elastomers. Shoe soles produced therefrom become brittle relatively quickly, by comparison with those based on pure 4,4'-diphenylmethane diisocyanate.

It is also known that polyurethane urea elastomers can be produced by the casting process. In this case, prepolymers containing NCO-groups generally synthesized with tolylene diisocyanate, are reacted with aromatic diamines as chain-extending agent. High-quality elastomers are also obtained in this way, as described in U.S. Pat. No. 3,188,302 using 3,3'-dichlorodiphenylmethane-4,4'-diamine as the chain-extending agent or in German Auslegeschrift No. 1,803,635 using 3,5-diamino-4-chlorobenzoic acid isobutyl ester.

If an attempt is made to produce polyurethane urea elastomers such as these by the casting process using diphenylmethane diisocyanate as the isocyanate component, problems arise both in regard to the processibility of the prepolymer and in regard to the mechanical properties of the end product.

Prepolymers synthesized from 1 mole of a relatively high molecular weight polyhydroxyl compound and 2 moles (or less) of 4,4'-diisocyanatodiphenylmethane have a very high viscosity, which gives rise to serious processing problems, particularly in high-pressure machines. Prepolymers having viscosities of more than 2000 mPa.s can no longer be satisfactorily mixed in high-pressure machines. On the other hand, the temperature cannot be increased significantly beyond 70° C. in order to reduce the viscosity because the reaction velocity increases and the stability of the prepolymers distinctly decreases with increasing temperature.

Because of the high viscosity of the prepolymers based on 4,4'-diphenylmethane diisocyanate, the casting mixtures show poor flow properties and are difficult to homogenize with the result that it is not possible to cast moldings of large volume. Another disadvantage of prepolymers such as these lies in their unsatisfactory storage stability due in particular to dimerization of the isocyanate groups into uretdione groups.

One way of reducing the viscosity of the prepolymers while, at the same time, improving their storage stability is to use more than 2 moles of isocyanate per mole of the relatively high molecular weight diol during their production, so that the prepolymer contains relatively large quantities of free monomeric 4,4'-diisocyanatodiphenylmethane. However, this approach is attended by the disadvantage that, even in cases where diamines of low reactivity are used, the reaction velocity during the chain-extending reaction increases greatly with increasing free diisocyanate content of the prepolymer. This results in casting times of the reaction mixture which are too short.

If an attempt is made to reduce the high reaction velocity of the casting mixture by diluting the amine component with polyols, a further problem arises, i.e, the highly symmetrical rigid segments which are formed from 4,4'-diphenylmethane diisocyanate and aromatic diamines are not sufficiently soluble in the reaction mixture. Accordingly, most of these rigid segments are precipitated without being incorporated in a polyurethane molecule. As a result, the mechanical properties of these elastomers are unsatisfactory.

Finally, prepolymers based on pure 4,4'-diphenylmethane diisocyanate cannot be processed satisfactorily with highly reactive aromatic diamines, such as, for example, alkyl-substituted tolylene diamines and phenylene diamines, because of the high reactivity of the two isocyanate groups.

Accordingly, the object of the present invention is to provide casting systems which, on the one hand, result in elastomers having the outstanding property spectrum of products based on 4,4'-diisocyanatodiphenylmethane, but which on the other hand have improved processibility, even where the highly reactive alkyl-substituted phenylene diamines and diaminodiphenylmethanes are used.

It has surprisingly been found that this object may be achieved by using certain isomer mixtures of diisocyanatodiphenylmethane during the synthesis of the prepolymer component. This must be regarded as surprising because, from the above-discussed experiences with diol-extended casting systems, it had been expected that the properties of polyurethane urea elastomers would also be considerably impaired by using isomer mixtures as opposed to pure 4,4'-diisocyanatodiphenylmethane.

DESCRIPTION OF THE INVENTION

The present invention relates to a process for the production of optionally cellular polyurethane urea elastomers having a gross density of more than 200 kg/m$^3$ by casting a reaction mixture of (A) an NCO-prepolymer produced from
  (a) 1 mole of a compound containing at least 2 Zerewitinoff-active hydrogen atoms and having a molecular weight of from 400 to 10,000, preferably a polyhydroxyl compound, and
  (b) 2 to 10 moles and preferably 2.5 to 5 moles of diisocyanatodiphenylmethane;

(B) an aromatic diamine;

(C) 0 to 50 mole percent and preferably less than 30 mole percent, based on component (B), of a polyol containing and having a molecular weight of from 62 to 6000, and preferably from 1000 to 5000; and optionally (D) blowing agents, activators, fillers and other additives, the equivalent ratio between component (A)

and components (B)+(C) being 0.9:1 and 1.3:1 and preferably between 1.0:1 and 1.15:1,
into molds, hardening the reaction mixture in the mold and removing the hardened reaction mixture from the mold, characterized in that the NCO-prepolymer (A) has been produced using an isomer mixture comprising (i) from 15 to 80 mole percent and preferably from 35 to 70 mole percent of 2,4'-diisocyanatodiphenylmethane;

(ii) from 20 to 85 mole percent and preferably from 30 to 65 mole percent of 4,4'-diisocyanatodiphenylmethane; and (iii) from 0 to 20 mole percent and preferably from 0 to 15 mole percent of 2,2'-diisocyanatodiphenylmethane.

It is particularly preferred to use bifunctional polyesters having a molecular weight of from 100 to 3000 and polyether diols having a molecular weight of from 1000 to 5000 for the production of the prepolymer (A).

Preferred aromatic diamines (B) are alkyl-substituted phenylene diamines and diphenylmethane diamines.

The mixing components (C) for the diamine are polyfunctional and in particular bifunctional polyols, such as polyethers having a molecular weight of from 1000 to 5000 and containing terminal ethylene oxide groups, polyester and polycarbonate diols having a molecular weight of from 1000 to 2500, polytetrahydrofurans having a molecular weight of from 1000 to 2000 and polypropylen ether-glykols with secondary hydroxyl-groups. Polyols (C) containing primary hydroxyl groups are preferred.

In the production of the prepolymer, the components (a) and (b) are reacted in such a ratio that for one equivalent of component (a) there are at least two equivalents of diphenylmethane diisocyanate isomer mixture. In general, an excess of free isocyanate is present, i.e., the equivalent ratio of component (a) to diisocyanate amounts to between 1:2.5 and 1:5.

The quantity in which the chain-extending component is used depends on whether the diamine is mixed with polyol or is present in pure form. Accordingly, the quantity in which the amine component is used may vary between 10 and 100 parts by weight per 100 parts by weight of prepolymer, although it is preferred to use from 15 to 60 parts of chain-extender per 100 parts by weight of prepolymer. In general, the prepolymers are reacted with the amine or amine/polyol mixture at indices of from 90 to 130 and preferably at indices of from 100 to 115.

Fillers may be present both in the prepolymer and in the amine/polyol mixture in quantities of from about 0 to 25% by weight (preferably 1 to 25%) and from about 0 to 35% by weight (preferably 1 to 35%), respectively. The fillers used, such as carbon blacks, precipitated silicas, or organic fillers (for example, styrene-acrylonitrile-grafted polyethers or polyhydrazodicarbonamides in polyethers), may improve the mechanical properties of the elastomers generally or may favorably affect only certain properties of the finished article produced from the elastomer, such as its resistance to heat or its non-slip property (in the case of shoe soles).

The casting process according to the invention has the following, to some extent, unexpected and surprising, advantages:

1. The diphenylmethane diisocyanate mixtures used for producing the prepolymer are liquid at temperatures above 10° C. and are therefore easy to process.

2. The elastomers obtained have extremely high-quality mechanical properties which are equivalent to or even exceed the quality of elastomers of casting systems based on 4,4'-diphenylmethane diisocyanate and short-chain diols.

3. Elastomers having high-quality mechanical properties may even be produced from systems characterized by a high diisocyanate excess in contrast to those based on 4,4'-diphenylmethane diisocyanate.

4. The storage stability of the prepolymers is distinctly better than that of prepolymers based on 4,4'-diphenylmethane diisocyanate.

5. Because of the low viscosity of the casting mixtures, casting is made considerably easier, particularly in high-pressure machines, and in some cases, is made possible for the first time. The reaction velocity which decreases with an increasing content of assymetrical 2,4'-diisocyanate affords further advantages: complicated molds may be filled satisfactorily so that the quality of the molding increases, i.e., the number of rejects decreases.

6. By virtue of the relatively low reactivity of the prepolymers, it is now also possible to process highly reactive aromatic diamines which cannot be cast with prepolymers based on pure 4,4'-diphenylmethane diisocyanate.

Suitable compounds (a) for producing the prepolymer (A) are compounds containing at least two isocyanate-reactive hydrogen atoms and having a molecular weight of generally from 400 to 10,000. In addition to compounds containing amino groups, thiol groups or carboxyl groups, compounds such as these are, preferably, compounds containing hydroxyl groups, particularly, compounds containing from 2 to 8 hydroxyl groups, above all those having molecular weights of from 500 to 8000 and preferably from 800 to 5000. Examples include polyesters, polyethers, polythioethers, polyacetals, polycarbonates and polyester amides containing at least 2, generally from 2 to 8, but preferably from 2 to 4 hydroxyl groups.

The polyesters containing hydroxyl groups suitable for use in accordance with the invention are, for example, reaction products of polyhydric, preferably dihydric alcohols to which trihydric alcohols may be added with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be substituted (for example, by halogen atoms) and/or unsaturated.

Examples of carboxylic acids such as these and their derivatives are succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimerized and trimerized unsaturated fatty acids, which may be used in admixture with monomeric unsaturated fatty acids, such as oleic acid; terephthalic acid dimethyl ester and terephthalic acid-bis-glycol ester. Suitable polyhydric alcohols are, for example, ethylene glycol; 1,2- and 1,3-propylene glycol; 1,4- and 2,3-butylene glycol; 1,6-hexane diol; 1,8-octane diol; neopentyl glycol; 1,4-bis-hydroxymethyl cyclohexane; 2-methyl-1,3-propane diol; glycerol; trimethylol propane, 1,2,6-hexane triol; 1,2,4-butane triol; trimethylol ethane; pentaerythritol; quinitol; mannitol and sorbitol; formitol; methyl glycoside; diethylene glycol, triethylene glycol; tetraethylene glycol and higher polyethylene glycols; dipropylene glycol and higher polypropylene glycols; and dibutylene glycol and higher polybutylene glycols. The polyesters may contain terminal carboxyl groups. Polyesters of lactones, for example, ε-caprolactone, or polyesters of hydroxy carboxylic acids, for example, ω-hydroxy caproic acid, may also be used.

The polyethers containing at least 2, generally 2 to 8 and preferably 2 to 3 hydroxyl groups suitable for use in accordance with the invention are obtained, for example, by polymerizing epoxides (such as ethylene oxide, propylene oxide, butylene oxide, tetrahydrofuran, styrene oxide or epichlorohydrin) on their own, for example, in the presence of Lewis catalysts (such as, boron trifluoride) or by the addition of these epoxides (preferably ethylene oxide and propylene oxide), either in admixture or successively, with starter components containing reactive hydrogen atoms (such as, water, alcohols, ammonia or amines). Examples of starter components containing reactive hydrogen atoms include ethylene glycol, 1,3-propylene glycol or 1,2-propylene glycol; trimethylol propane; glycerol; sorbitol; 4,4'-dihydroxy diphenyl propane; aniline; ethanolamine or ethylene diamine. Sucrose polyethers of the type described in German Auslegeschriften Nos. 1,176,358 and 1,064,938 and formitol- or formose-started polyethers as described in German Offenlegungsschriften Nos. 2,639,083 and 2,737,951 may also be used in accordance with the invention. In many cases, it is preferred to use polyethers which predominantly contain primary hydroxyl groups (up to 90% by weight, based on all the hydroxyl groups present in the polyether). Polybutadienes containing hydroxyl groups are also suitable for use in accordance with the invention.

Among the polythioethers, reference is made in particular to the condensation products of thiodiglycol on their own and/or with other glycols, dicarboxylic acids, formaldehyde, aminocarboxylic acids or amino alcohols. Depending on the co-components, the products in question are, for example, polythio mixed ether, polythioether esters of polythioether amides.

Suitable polyacetals are, for example, the compounds obtainable from glycols such as diethylene glycol, triethylene glycol, 4,4'-dioxethoxy diphenyl dimethyl methane, hexane diol and formaldehyde. Polyacetals suitable for use in accordance with the invention may also be obtained by polymerizing cyclic acetals such as trioxane (German Offenlegungsschrift 1,694,128).

Suitable polycarbonates containing hydroxyl groups are known per se and can be obtained, for example, by reacting diols (such as, 1,3-propane diol, 1,4-butane diol and/or 1,6-hexane diol, diethylene glycol, triethylene glycol, tetraethylene glycol or thiodiglycol) with diaryl carbonates (for example, diphenyl carbonate, or phosgene as described in German Auslegeschriften Nos. 1,694,080; 1,915,908 and 2,221,751 and German Offenlegungsschrift No. 2,605,024).

The polyester amides and polyamides include the predominantly linear condensates obtained, for example, from polybasic, saturated or unsaturated, carboxylic acids or their anhydrides and polyhydric, saturated or unsaturated, amino alcohols, diamines, polyamines and mixtures thereof.

Polyhydroxyl compounds already containing urethane or urea groups and natural polyols, such as, castor oil which may be modified or carbohydrates, for example, starch, may also be used. Addition products of alkylene oxides with phenol-formaldehyde resins or even with urea-formaldehyde resins may also be used in accordance with the invention.

Before they are used in the polyisocyanate-polyaddition process, the above-mentioned polyhydroxyl compounds may be modified in various ways: thus, according to German Offenlegungsschriften Nos. 2,210,839 (U.S. Pat. No. 3,849,515) and 2,544,195, a mixture of different polyhydroxyl compounds, for example, a polyether polyol and a polyester polyol, may be condensed by etherification in the presence of a strong acid to form a relatively high molecular weight polyol which is made up of different segments attached through ether bridges. It is also possible in accordance with German Offenlegungsschrift No. 2,559,372 to introduce amide groups into the polyhydroxyl compounds or, in accordance with German Offenlegungsschrift No. 2,620,487 to introduce triazine groups by reaction with polyfunctional cyanic acid esters. The reaction of a polyol with a less than equivalent quantity of a diisocyanatocarbodiimide, followed by reaction of the carbodiimide group with an amine, amide phosphite or carboxylic acid, gives polyhydroxyl compounds containing guanidine, phosphonoformamidine or acyl urea groups as described in German Offenlegungsschriften Nos. 2,714,289; 2,714,292 and 2,714,293. In some cases, it is of particular advantage completely or partially to convert the relatively high molecular weight polyhydroxyl compounds into the corresponding anthranilic acid esters by reaction with isatoic acid anhydride, as described in German Offenlegungsschriften Nos. 2,019,432 and 2,619,840 and in U.S. Pat. Nos. 3,808,250; 3,975,428 and 4,016,143. Relatively high molecular weight compounds containing terminal aromatic amino groups are obtained in this way.

According to German Offenlegungsschrift No. 2,546,536 and U.S. Pat. No. 3,865,791, relatively high molecular weight compounds containing terminal amino groups are obtained by reacting NCO-prepolymers with enamines, aldimines or ketimines containing hydroxyl groups, followed by hydrolysis. Additional processes for producing relatively high molecular weight compounds containing terminal amino groups or hydrazide groups are described in German Offenlegungsschrift No. 1,694,152 (U.S. Pat. No. 3,625,871).

According to the invention, it is also possible to use polyhydroxyl compounds containing high molecular weight polyadducts and polycondensates or polymers in finely disperse or dissolved form. Polyhydroxyl compounds such as these are obtained, for example, by carrying out polyaddition reactions (for example, reactions between polyisocyanates and aminofunctional compounds) and polycondensation reactions (for example, between formaldehyde and phenols and/or amines in situ) in the above-mentioned compounds containing hydroxyl groups. Processes such as these are described in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. However, it is also possible, in accordance with U.S. Pat. No. 3,869,413 or German Offenlegungsschrift No.

2,550,860 to mix an aqueous polymer dispersion with a polyhydroxyl compound and to subsequently remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795 or U.S. Pat. No. 3,637,909) are also suitable for use in the process according to the invention. Plastics having particularly good flameproof properties are obtained by using polyether polyols modified in accordance with German Offenlegungsschriften Nos. 2,442,101; 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and optionally, other olefinically unsaturated monomers (German Offenlegungsschriften Nos. 2,714,291; 2,739,620 and 2,654,746) may be used with particular advantage in combination with mineral fillers.

Where modified polyhydroxyl compounds of the type mentioned above are used as starting component in the polyisocyanate-polyaddition process, polyurethanes having considerably improved mechanical properties are formed in many cases.

Examples of the above-mentioned compounds used in accordance with the invention are described, for example, in *High Polymers*, Vol. XVI, "Polyurethane, Chemistry and Technology", by Saunders-Frisch, Interscience Publishers, New York/London, Vol. I, 1962, pages 32 to 42 and pages 44 to 54 and Vol. II, 1964, pages 5-6 and 198-199 and in Kunststoff-Handbuch, Vol. VII, Vieweg-Hochtlen, Carl-Hanser-Verlag, Munich, 1966, for example, on pages 45 to 71.

It is, of course, possible to use mixtures of the above-mentioned compounds containing at least two isocyanate-reactive hydrogen atoms and having a molecular weight of from 400 to 10,000, for example, mixtures of polyethers and polyesters. In some cases, it is of particular advantage to combine low-melting and high-melting polyhydroxyl compounds with one another (German Offenlegungsschrift No. 2,706,297).

The isomer mixtures used as isocyanate component (b) in the production of the NCO-prepolymer (A) may be obtained by known processes, for example, by the fractional distillation of crude polyphenyl-polymethylene-polyisocyanate, in which case it is possible to isolate precisely defined mixtures of 2,4'-/4,4'-diphenylmethane diisocyanate.

According to the invention, other polyisocyanates may also be used in quantities of up to 10 mole percent, based on component (b).

Examples of aromatic diamines (B) are bisanthranilic acid esters (German Offenlegungsschriften Nos. 2,040,644 and 2,160,590), 3,5- and 2,4-diaminobenzoic acid esters (German Offenlegungsschrift 2,025,900), diamines containing esters groups (German Offenlegungsschriften Nos. 1,803,635; 2,040,650 and 2,160,589 and U.S. Pat. Nos. 3,681,290 and 3,736,350), diamines containing ether groups (German Offenlegungsschriften Nos. 1,770,525 and 1,809,172 and U.S. Pat. Nos. 3,654,364 and 3,736,295), 2-halogen-1,3-phenylene diamines which may be substituted in the 5-position (German Offenlegungsschriften Nos. 2,001,772; 2,025,896 and 2,065,869), 3,3'-dichloro-4,4'-diaminodiphenylmethane, tolylene diamine, 4,4'-diaminodiphenylmethane, 4,4'-diaminodiphenyl disulfides (German Offenlegungsschrift No. 2,404,976), diaminodiphenyl dithioethers (German Offenlegungsschrift No. 2,509,404), aromatic diamines substituted by alkyl thio groups (German Offenlegungsschrift No. 2,638,760), diaminobenzene phosphonic acid esters (German Offenlegungsschrift No. 2,459,491), aromatic diamines containing sulfonate or carboxylate groups (German Offenlegungsschrift No. 2,720,166) and the high-melting diamines described in German Offenlegungsschrift No. 2,635,400. Examples of aliphatic-aromatic diamines are the aminoalkyl thioanilines according to German Offenlegungsschrift No. 2,734,574.

Aromatic diamines containing at least one alkyl substituent, preferably with one to three carbon atoms, in the o-position to the amino group are particularly suitable for the process according to the invention. These include, for example, 1,3-diethyl-2,4-diaminobenzene; 2,4-diaminomesitylene; 1-methyl-3,5-diethyl-2,4-diaminobenzene; 1-methyl-3,5-diethyl-2,6-diaminobenzene; 1,3,5-triethyl-2,6-diaminobenzene or 3,5,3',5'-tetraethyl-4,4'-diaminodiphenylmethane.

Further examples of diamines such as these are compounds corresponding to the following general formula:

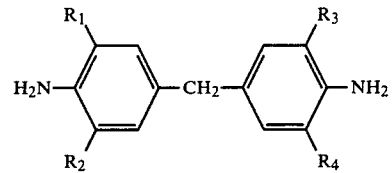

in which
R$_1$ represents an alkyl radical, preferably containing from 1 to 3 carbon atoms, and
R$_2$, R$_3$ and R$_4$ which may be the same or different, represent hydrogen or an alkyl radical preferably containing from 1 to 4 carbon atoms.

According to the invention, it is of course also possible to use mixtures of the above-mentioned diamines.

It is particularly preferred to use 1-methyl-3,5-diethyl-diaminobenzene or a mixture thereof with 1-methyl-3,5-diethyl-2,6-diaminobenzene.

The mixing component (C) which may be used for the aromatic diamine (B) may be formed by the compounds containing at least two primary hydroxyl groups and having a molecular weight of from 62 to 6000, although it is preferably formed by polyethers, polyesters or polycarbonates containing primary and/or secondary hydroxyl groups and having a molecular weight of from 1000 to 5000, of the type mentioned above. The reinforcing fillers used consist of the materials such as carbon black, silica, metal reinforcing elements, glass, plasticizers and/or extender oils. These fillers are preferably very uniformly dispersed in the NCO-prepolymer or in component (C).

According to the invention, the following auxiliaries and additives may also be used:

Any blowing agent used for the production of cellular polyurethane elastomers, for example, water and/or readily volatile substances, such as monofluorotrichloromethane, chlorodifluoromethane, butane or diethyl ether may be used.

However, these blowing agents are used in at most such a quantity that the end product has a density of at least 200 kg/m$^3$ and preferably more than 500 kg/m$^3$. However, it is particularly preferred to produce noncellular products in accordance with the invention.

Catalysts, for example, tertiary amines (such as triethylamine, tributylamine); N-methyl morpholine; N-ethyl morpholine; N,N,N',N'-tetramethyl ethylene diamine; pentamethyl diethylene triamine and higher homologs (German Offenlegungsschriften Nos. 2,624,527 and 2,624,528); 1,4-diazabicyclo-(2,2,2)-octane; N-methyl-N'-dimethylaminoethyl piperazine; bis-(dimethylaminoalkyl)-piperazines (German Offenlegungsschrift No. 2,636,787); N,N-dimethyl benzylamine; N,N-dimethyl cyclohexylamines; N,N-diethyl benzylamine; bis-(N,N-diethylaminoethyl)-adipate; N,N,N',N'-tetramethyl-1,3-butane diamine; N,N-dimethyl-β-phenyl ethylamine; 1,2-dimethyl imidazole; 2-methyl imidazole; monocyclic and bicyclic amidines (German Offenlegungsschrift No. 1,720,633); bis-(dialkylamino)-alkyl ethers (U.S. Pat. No. 3,330,782, German Auslegeschrift No. 1,030,558 and German Offenlegungsschriften Nos. 1,804,361 and 2,618,280) and tertiary amines containing amide groups, preferably formamide groups, according to German Offenlegungsschriften Nos. 2,523,633 and 2,732,292. Suitable catalysts are also Mannich bases of secondary amines (such as dimethylamine) and aldehydes (preferably formaldehyde) or ketones (such as acetone, methylethyl ketone or cyclohexanone) and phenols (such as phenol, nonyl phenol or bisphenol).

Tertiary amines containing isocyanate-reactive hydrogen atoms suitable for use as catalysts are, for example, triethanolamine; triisopropanolamine; N-methyl diethanolamine; N-ethyl diethanolamine; N,N-dimethyl ethanolamine; and their reaction products with alkylene oxides (such as propylene oxide and/or ethylene oxide). Secondary-tertiary amines according to German Offenlegungsschrift No. 2,732,292 may also be used.

Other suitable catalysts are sila-amines containing carbon-silicon bonds, of the type described, for example, in German Pat. No. 1,229,290 (U.S. Pat. No. 3,620,984), for example, 2,2,4-trimethyl-2-silamorpholine and 1,3-diethylaminomethyl tetramethyl disiloxane.

Other suitable catalysts are nitrogen-containing bases (such as tetraalkyl ammonium hydroxides), alkali metal hydroxides (such as sodium hydroxide), alkali metal phenolates (such as sodium phenolate), or alkali metal alcoholates (such as sodium methylate). Hexahydrotriazines may also be used as catalysts (German Offenlegungsschrift No. 1,769,043).

The reaction between isocyanate groups and Zerewitinoff-active hydrogen atoms is also greatly accelerated by lactams and azalactams, an associate between the lactam and the compound containing acid hydrogen being formed initially. Associates such as these and their catalytic effect are described in German Offenlegungsschriften Nos. 2,062,288; 2,062,289; 2,117,576 (U.S. Pat. No. 3,758,444); 2,129,198; 2,330,175 and 2,330,211.

According to the invention, it is also possible to use organometallic compounds, particularly organo tin compounds, as catalysts. In addition to sulfur-containing compounds, such as di-n-octyl tin mercaptide (German Auslegeschrift No. 1,769,367 and U.S. Pat. No. 3,654,927), preferred organo tin compounds are tin(II) salts of carboxylic acids, such as tin(II) acetate; tin(II) octoate; tin(II) ethyl hexoate and tin(II) laurate. Tin-(IV) compounds, for example, dibutyl tin oxide; dibutyl tin dichloride; dibutyl tin diacetate; dibutyl tin dilaurate; dibutyl tin maleate and dioctyl tin diacetate are also preferred.

All of the above-mentioned catalysts may, of course, be used in the form of mixtures. In this respect, combinations of organometallic compounds and amidines, aminopyridines or hydrazino pyridines (German Offenlegungsschriften Nos. 2,434,185; 2,601,082 and 2,603,834) are of particular interest.

Further examples of catalysts which may be used in accordance with the invention and information on the way in which they work can be found in Kunststoff-Handbuch by Vieweg and Hochtlen, Vol. VII, Carl-Hanser-Verlag, Munich, 1966, for example, on pages 96 to 102.

These catalysts are generally used in a quantity of from about 0.001 to 10% by weight, based on the total quantity of compounds containing at least two isocyanate-reactive hydrogen atoms.

Surface active additives, such as emulsifiers and foam stabilizers may also be used. Suitable emulsifiers are, for example, the sodium salts of castor oil sulfonates or salts of fatty acids with amines, such as diethylamine oleate or diethanolamine stearate. Alkali metal or ammonium salts of sulfonic acids (such as, for example, dodecyl benzene sulfonic acid or dinaphthyl methane disulfonic acid), or of fatty acids (such as ricinoleic acid), or of polymeric fatty acids may also be used as surface-active additives.

Suitable foam stabilizers are, above all, polyether siloxanes, particularly water soluble types. The structure of these compounds is generally such that a copolymer of ethylene oxide and propylene oxide is attached to a polydimethyl siloxane residue. Foam stabilizers such as these are described in U.S. Pat. Nos. 2,834,748; 2,917,480 and 3,629,308. In many cases, polysiloxane-polyoxyalkylene copolymers branched through allophanate groups (German Offenlegungsschrift No. 2,558,523) are of particular interest.

Reaction retarders, for example, acid-reacting substances such as hydrochloric acid or organic acid halides may be present. Cell regulators such as paraffins or fatty alcohols or dimethyl polysiloxanes may be present. Pigments, dyes and flameproofing agents, for example, tris-chloroethyl phosphate, tricresyl phosphate or ammonium phosphate and polyphosphate may be present. Stabilizers against the effects of ageing and weather, plasticizers, fungistatic and bacteriostatic substances, and fillers (such as barium sulfate, kieselguhr, carbon black or whiting) may also be present. Further examples of surface-active additives and foam stabilizers, cell regulators, reaction retarders, stabilizers, flameproofing agents, plasticizers, dyes, fillers, fungistatic and bacteriostatic substances which may be used in accordance with the invention and information on the way in which these additives are used and on their respective modes of action can be found in Kunststoff-Handbuch by Vieweg and Hochtlen, Vol. VII, Carl-Hanser-Verlag, Munich, 1966, for example, on pages 103 to 113.

The process according to the invention is carried out as follows.

According to the invention, the reaction components may be reacted by the one-shot process, by the prepolymer process or by the semi-prepolymer process, in many cases using processing machines, for example, of the type described in U.S. Pat. No. 2,764,565. Particulars of processing machines which may also be used in accordance with the invention can be found in Kunststoff-Handbuch by Vieweg and Hochtlen, Vol. VII, Carl- Hanser-Verlag, Munich, 1966, for example, on pages 121 to 205.

In the production of foams, it is also possible to carry out foaming in closed molds. To this end, the reaction mixture is introduced into a mold. Suitable mold materials are metals (for example, aluminum) or plastics (for example, epoxide resins). The foamable reaction mixture foams in the mold and forms the molding. In-mold foaming may be carried out in such a way that the molding has a cellular structure at its surface, although it may also be carried out in such a way that the molding has a compact skin and a cellular core. In this connection, it is possible in accordance with the invention to introduce foamable reaction mixture into the mold in such a quantity that the foam formed just fills the mold. However, it is also possible to introduce into the mold more foamable reaction mixture than is required for filling the interior of the mold with foam. This particular technique is known as overcharging (U.S. Pat. Nos. 3,178,490 and 3,182,104).

In many cases, "external release agents", such as silicone oils, are used for in-mold foaming. However, it is also possible to use so-called "internal release agents", which may be used in admixture with external release agents (German Offenlegungsschriften Nos. 2,121,670 and 2,307,589).

The elastomers produced in accordance with the invention are relatively flexible, but show outstanding mechanical properties. They may be used for any application requiring high-quality, flexible, rubber-elastic materials and may, therefore, replace rubber in many of its applications. The non-cellular elastomers produced in accordance with the invention are particularly suitable for the production of pneumatic tires and parts such as wear-resistant tire treads. The non-cellular elastomers may also be used for flexible bodywork sections of motor vehicles, crash barriers and skirting boards, seals, V-belts, rollers and mats. Cellular elastomers are used, for example, for spring elements, shock absorbers, vibration dampers, shoe soles and, generally, for the same applications as sponge rubber.

The process according to the invention is illustrated by the following Examples in which the quantities quoted represent parts by weight and percentages by weight, unless otherwise indicated.

EXAMPLE 1 (Comparison Example)

2000 g of a linear polypropylene glycol ether (molecular weight 2000: hydroxyl number 56) are heated to 70° C. with 920 g of 4,4'-diisocyanatodiphenylmethane and kept at that temperature until an isocyanate content of 7.65% is obtained.

500 g of the isocyanate prepolymer are briefly degassed in a water jet vacuum at 80° C. and thoroughly mixed for 30 seconds with 40 g of butane diol. The reaction mixture is cast into a mold heated to 100° C. After it has been removed from the mold, the casting is tempered for 24 hours at 110° C. The casting time of the mixture amounts to between about 2 and 3 minutes. After 10 minutes, the test specimen can be removed from the mold. The mechanical properties of the elastomer are shown in Table 1.

EXAMPLE 2 (Comparison Example)

The procedure is as in Example 1, except that the pure 4,4'-diisocyanatodiphenylmethane is replaced by a mixture of 2,4'- and 4,4'-diisocyanatodiphenylmethane in a ratio of 1:1. A prepolymer having an isocyanate content of 7.6% is obtained.

If batches of 500 g of this isocyanate prepolymer are crosslinked with 40 g of 1,4-butane diol in the same way as in Example 1, inelastic, soft materials of thermoplastic character generally having very poor quality properties by comparison with Example 1 are obtained after a casting time of 3 minutes.

EXAMPLE 3 (Comparison Example)

1000 g of a linear polyester of adipic acid and ethylene glycol (molecular weight 2000: hydroxyl number 56) are heated for 3 hours to 60°–70° C. with 280 g of 4,4'-diisocyanatodiphenylmethane. A solid, wax-like product (isocyanate content: 4%) is obtained after cooling.

500 g of this isocyanate prepolymer are briefly degassed at 80° to 90° C. and mixed homogeneously for 30 seconds with 52.5 g of molten 3,5-diamino-4-chlorobenzoic acid isobutyl ester. The mixture is then cast into a mold preheated to 100° C. The reacting mixture remains castable for 2 to 3 minutes and solidifes after 6 to 7 minutes. After the casting has been removed from the mold, it is tempered for 24 hours at 110° C.

EXAMPLE 4

If the pure 4,4'-diisocyanatodiphenylmethane of Example 3 is replaced by a mixture of 65% of 2,4'- and 35% of 4,4'-diisocyanatodiphenylmethane, a prepolymer having an isocyanate content of 4% is obtained.

500 g of this prepolymer are chain-extended as in Example 3 with 3,5'-diamino-4-chlorobenzoic acid isobutyl ester. The mechanical properties of the elastomer are shown in Table 1.

Examples of 1 and 2 show that where crosslinking is carried out with a glycol, only pure 4,4'-diisocyanatodiphenylmethane is suitable, not mixtures of 2,4'-/4,4'-diisocyanatodiphenylmethane.

By contrast, Examples 3 and 4 surprisingly show that the use of mixtures of 2,4'- and 4,4'-diisocyanatodiphenylmethane instead of the pure 4,4,'-isomer affords advantages above all in regard to tensile strength where amines are used for crosslinking.

EXAMPLE 5 (Comparison Example)

100 Parts by weight of a prepolymer (isocyanate content 10.7%), produced from a linear polypropylene glycol polyether having a molecular weight of 1000 (hydroxyl number 112) and 4,4'-diisocyanatodiphenylmethane, are mixed with a mixture of 21.7 parts by weight of 3,3'-dichlorodiphenylmethane-4,4'-diamine and 75 parts by weight of a linear polyether having a molecular weight of 2000, which contains terminal ethylene oxide sequences so that more than 90% of primary hydroxyl groups are present and 0.05 g of dibutyl tin dilaurate.

The reacting mixture is cast into a preheated open mold and removed from the mold after less than 5 minutes.

The mechanical properties of the moldings, which have a gross density of approximately 1.02 g/cc are set out in Table 2.

EXAMPLE 6

The formulation corresponds to Example 5, except that, instead of pure 4,4'-diisocyanatodiphenylmethane, a mixture of 2,4'- and 4,4'-diisocyanatodiphenylmethane (1:1) is used for producing the prepolymer. The results are set out in Table 2.

EXAMPLES 7 AND 8

The formulation and procedure are as in Examples 5 and 6, except that the 3,3'-dichloro-4,4'-diaminodiphenylmethane is replaced by 3,3'-dimethyl mercapto-4,4'-diaminodiphenylmethane (23.5 parts by weight). The results are set out in Table 2.

EXAMPLE 9 (Comparison Example)

100 parts by weight of a prepolymer (isocyanate content 4.9%), produced from a linear polypropylene glycol polyether containing 7% of carbon black and modified with ethylene oxide in such a way that it contains 90% of terminal primary hydroxyl groups for a hydroxyl number of 28, and 4,4'-diisocyanatodiphenylmethane are mixed with a mixture of 45 parts by weight of the same polyether and 12.3 parts by weight of 3,3'-dimethyl mercapto-4,4'-diaminodiphenylmethane, 0.05 g of dibutyl tin dilaurate and 0.5 g of dibutyl phosphate.

The reacting mixture is processed into an elastomer in the same way as described in Example 5. The mechanical properties of the elastomer are shown in Table 2.

EXAMPLE 10

The procedure is as in Example 9, except that the pure 4,4'-isomer is replaced by a mixture of 50% of 2,4'- and 50% of 4,4'-diisocyanatodiphenylmethane.

Examples 5, 6 and 7, 8 as pairs and, in particular, Examples 9, 10 as a pair show that the mechanical data of urea-group-containing elastomers based on 2,4'-/4,4'-diisocyanatodiphenylmethane mixtures are superior, above all in tensile strength to elastomers produced from pure 4,4'-diisocyanatodiphenylmethane.

EXAMPLES 11 TO 14

The polyether described in Example 9 having a hydroxyl number of 28 is used for producing the prepolymer.

3,5-diamino-4-methylbenzoic acid-[2-ethylhexyl]ester is used as the amine crosslinker. The prepolymer is reacted with the amine to form the elastomer at an index of 110, in the same way as described in Example 5. The composition of the diisocyanate, the isocyanate content of the prepolymer and the mechanical properties of the elastomers obtained are shown in Table 2.

EXAMPLES 15 AND 16

The procedure was as in Examples 11 to 14, except that the 3,5-diamino-4-methylbenzoic acid ester is replaced by a commercial mixture of diethyl tolylene diamine. The results are set out in Table 2.

EXAMPLES 17 TO 23

These Examples investigate the influence of the 2,2'-/2,4'-/4,4'-isomer ratio in prepolymer systems based on diisocyanatodiphenylmethane.

The polyether described in Example 9 having a hydroxyl number of 28 is used for producing the prepolymer, the prepolymer having an isocyanate content of 5%.

A combination of diethyl tolylene diamine (14.2 parts by weight per 100 parts by weight of prepolymer), 0.5 part by weight of trimethylol propane, 68 parts by weight of the polyether described in Example 9 having a hydroxyl number of 28 and 17 parts by weight of a trimethylolpropane-started polypropylene oxide containing terminal ethylene oxide sequences (hydroxyl number 28) is used as the crosslinking agent.

A mixture of 0.05 part by weight of dibutyl tin dilaurate and 0.3 part by weight of diaminobicyclooctane per 100 parts by weight of crosslinker are used for catalysis.

The mechanical data of the elastomers are shown in Table 3.

Two things are apparent from Examples 17 to 23:

1. The mechanical properties of the elastomers, particularly their tensile strength and tear propagation resistance, are optimal for an isomer content of from 35 to 70 mole percent of 2,4'-diisocyanatodiphenylmethane (Examples 18, 19, 20).

2. The mechanical values deteriorate with increasing content of 2,2'-diisocyanatodiphenylmethane (Examples 22, 23).

TABLE 1

Mechanical properties of the elastomers produced in accordance with Examples 1 to 4

| Example | Type of Extension: Crosslinking Agent | Isocyanate | NCO-Content of the prepolymer (%) | Tensile Strength (MPa) | Breaking Elongation (%) | Tear Propagation resistance (KN/m) | Shore-A-Hardness | Elasticity (%) |
|---|---|---|---|---|---|---|---|---|
| 1* | glycol crosslinking | 4,4'-diisocyanato-diphenyl-methane | 7.65 | 18 | 420 | 20 | 80 | 36 |
| 2* | glycol crosslinking | 50% of 4,4'- and 50% of 2,4'-diisocyanato-diphenylmethane | 7.7 | the material shows thermoplastic properties | | | | |
| 3* | amine crosslinking | 4,4'-diphenyl-methane di-isocyanate | 4.0 | 20.5 | 520 | 42 | 91 | 34 |
| 4 | amine crosslinking | 35% of 4,4'- and 65% of 2,4'-diisocyanato-diphenylmethane | 4.0 | 26.8 | 580 | 42.5 | 92 | 35 |

Tensile strength and breaking elongation were determined in accordance with DIN 53504; tear propagation resistance in accordance with DIN 53515; Shore-A-hardness in accordance with DIN 53503 and elasticity in accordance with DIN 53512.
*for comparison

TABLE 2

Mechanical properties of the elastomers obtained in accordance with Examples 5 to 16

| Example | Composition of the diisocyanato-diphenyl-methane 2,4'-% | 4,4'-% | NCO Content of the prepolymer % | Amine | Tensile test according to DIN 53504 δ100% (MPa) | δ300% (MPa) | δB (MPa) | εB (%) | Tear propagation resistance (KN/m) | Shore-A Hardness |
|---|---|---|---|---|---|---|---|---|---|---|
| 5* | — | 100 | 10.7 | 3,3'-dichloro-4,4'-diamino-diphenyl-methane | 5.7 | 7.0 | 9.3 | 320 | 39.5 | 90 |
| 6 | 50 | 50 | 10.7 | | 5.8 | 8.6 | 11.3 | 440 | 44.0 | 88 |
| 7* | — | 100 | 11.5 | 3,3'-dimethyl mercapto-4,4'-diamino diphenyl methane | 5.7 | 9.0 | 9.3 | 320 | 39.5 | 90 |
| 8 | 50 | 50 | 11.5 | | 5.9 | 9.1 | 14.6 | 490 | 44.1 | 88 |
| 9* | — | 100 | 4.9 | | — | — | 1.2 | 37 | 6.9 | 56 |
| 10 | 50 | 50 | 4.9 | | 2.1 | 3.9 | 6.2 | 651 | 19.8 | 62 |
| 11* | — | 100 | 3.4 | 3,5-diamino-4-methylbenzoic acid-2-ethyl hexyl ester | 3.5 | 5.6 | 11.9 | 1080 | 29.5 | 74 |
| 12 | 50 | 50 | 3.2 | | 3.5 | 5.7 | 13.7 | 1000 | 29.6 | 75 |
| 13* | — | 100 | 4.8 | | 4.8 | 6.9 | 11.9 | 740 | 37.7 | 89 |
| 14 | 50 | 50 | 4.8 | | 4.4 | 7.1 | 17.4 | 890 | 38.2 | 84 |
| 15* | — | 100 | 3.6 | diethyl tolylene diamine | 3.4 | 5.9 | 9.9 | 700 | 24.7 | 71 |
| 16 | 50 | 50 | 3.2 | diethyl tolylene diamine | 3.2 | 6.2 | 18.4 | 833 | 26.8 | 69 |

*for comparison

TABLE 3

Mechanical properties of the elastomers obtained in accordance with Examples 17 to 23

| Example | Composition of the diisocyanato-diphenylmethane (%) 2,2' | 2,4' | 4,4' | NCO-Content of the prepolymer % | Amine | Tensile test according to DIN 53504 δ100% (MPa) | δ300% (MPa) | δB (%) | εB (%) | Tear propagation resistance (KN/m) | Shore-A-hardness |
|---|---|---|---|---|---|---|---|---|---|---|---|
| 17 | | | 100 | 4.97 | diethyl tolylene diamine | 2.0 | 3.80 | 11.1 | 850 | 16.0 | 60 |
| 18 | | 70 | 30 | 4.94 | diethyl tolylene diamine | 2.0 | 3.85 | 13.3 | 950 | 18.7 | 60 |
| 19 | | 50 | 50 | 4.88 | diethyl tolylene diamine | 2.0 | 3.8 | 14.5 | 1100 | 21.0 | 59 |
| 20 | | 35 | 65 | 4.93 | diethyl tolylene diamine | 1.95 | 3.8 | 12.5 | 980 | 18.0 | 60 |
| 21 | | 15 | 85 | 5.0 | diethyl tolylene diamine | 2.0 | 3.85 | 11.8 | 880 | 16.5 | 60 |
| 22 | 10 | 50 | 40 | 4.91 | diethyl tolylene diamine | 1.8 | 3.4 | 13.5 | 1125 | 18.3 | 58 |
| 23 | 20 | 50 | 30 | 4.96 | diethyl tolylene diamine | 1.6 | 3.1 | 11.5 | 1150 | 18.3 | 56 |

What is claimed is:

1. In a process for the production of polyurethane urea elastomers having a gross density of more than 200 kg/m³ comprising: casting a reaction mixture of
(A) an isocyanate prepolymer produced from
   (a) 1 mole of a compound containing at least 2 Zerewitinoff-active hydrogen atoms and having a molecular weight of from 400 to 10,000 and
   (b) 2 to 10 moles of diisocyanatodiphenylmethane,
(B) an aromatic diamine, and
(C) 0 to 50 mole percent, based on component (B), of a polyol having a molecular weight of from 62 to 6000, the equvalent ratio between component (A) and components (B)+(C) amounting to between 0.9:1 and 1.3:1,
into a mold, hardening the reaction mixture in the mold and subsequently removing it from the mold, the improvement wherein said isocyanate prepolymer (A) has been produced using an isomer mixture comprising:

from 15 to 80 mole percent of 2,4'-diisocyanatodiphenylmethane, from 20 to 85 mole percent of 4,4'-diisocyanatodiphenylmethane, and from 0 to 20 mole percent of 2,2'-diisocyanatodiphenylmethane.

2. The process of claim 1, wherein said reaction mixture further comprises:

(D) blowing agents, activator fillers and/or other additives.

3. The process of claim 1, wherein said isocyanate prepolymer (A) has been produced using an isomer mixture comprising:

from 35 to 70 mole percent of 2,4'-diisocyanatodiphenylmethane, from 30 to 65 mole percent of 4,4'-diisocyanatodiphenylmethane, and from 0 to 15 mole percent of 2,2'-diisocyanatodiphenylmethane.

4. The process of claim 1, wherein a molar ratio between components (a) and (b) of from 1:2.5 to 1:5 is maintained during production of said isocyanate prepolymer (A).

* * * * *